E. J. HOUGH.
SHOCK ABSORBER.
APPLICATION FILED APR. 3, 1915.
1,171,722.
Patented Feb. 15, 1916.
4 SHEETS—SHEET 4.
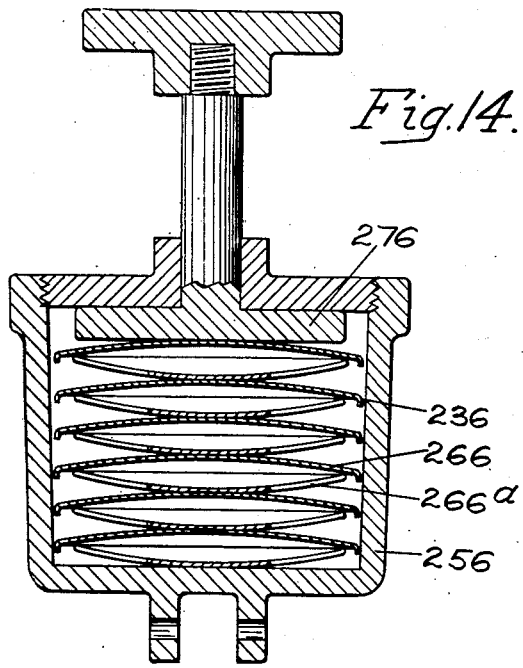
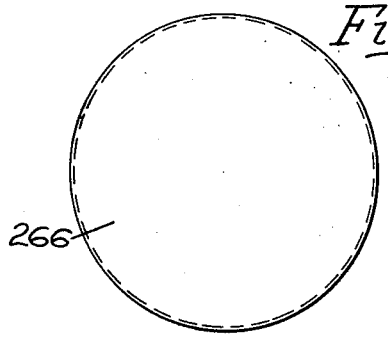
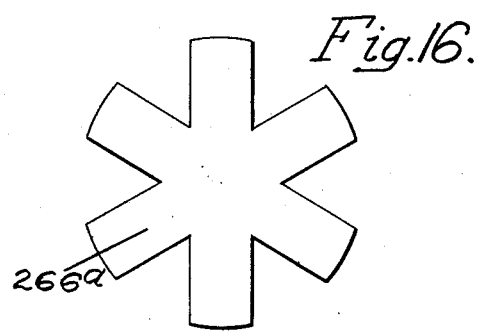
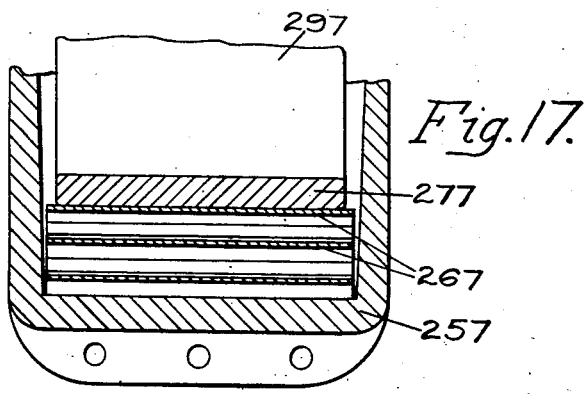
Witnesses
Inventor
Edgar J. Hough
By
Attorneys

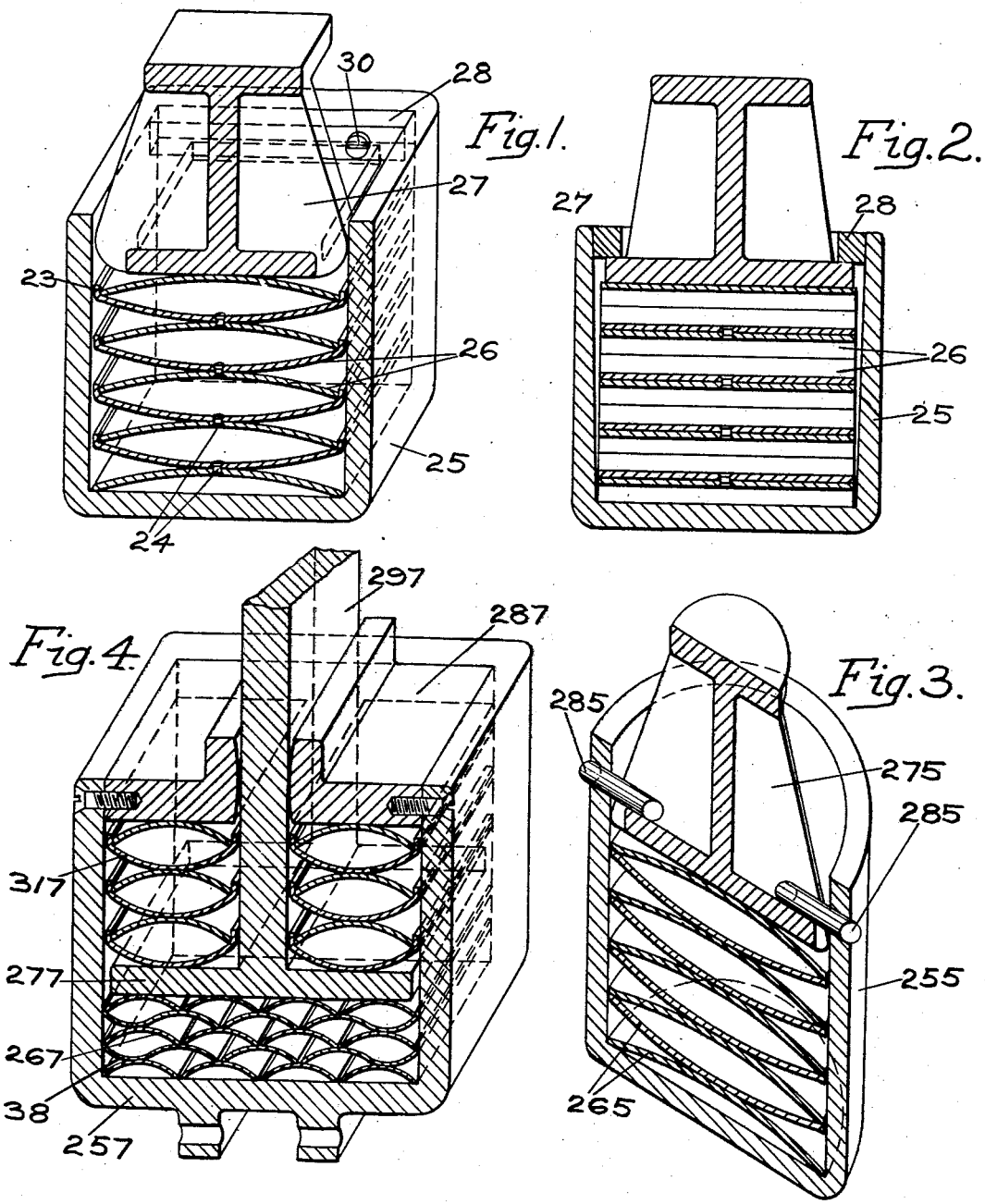

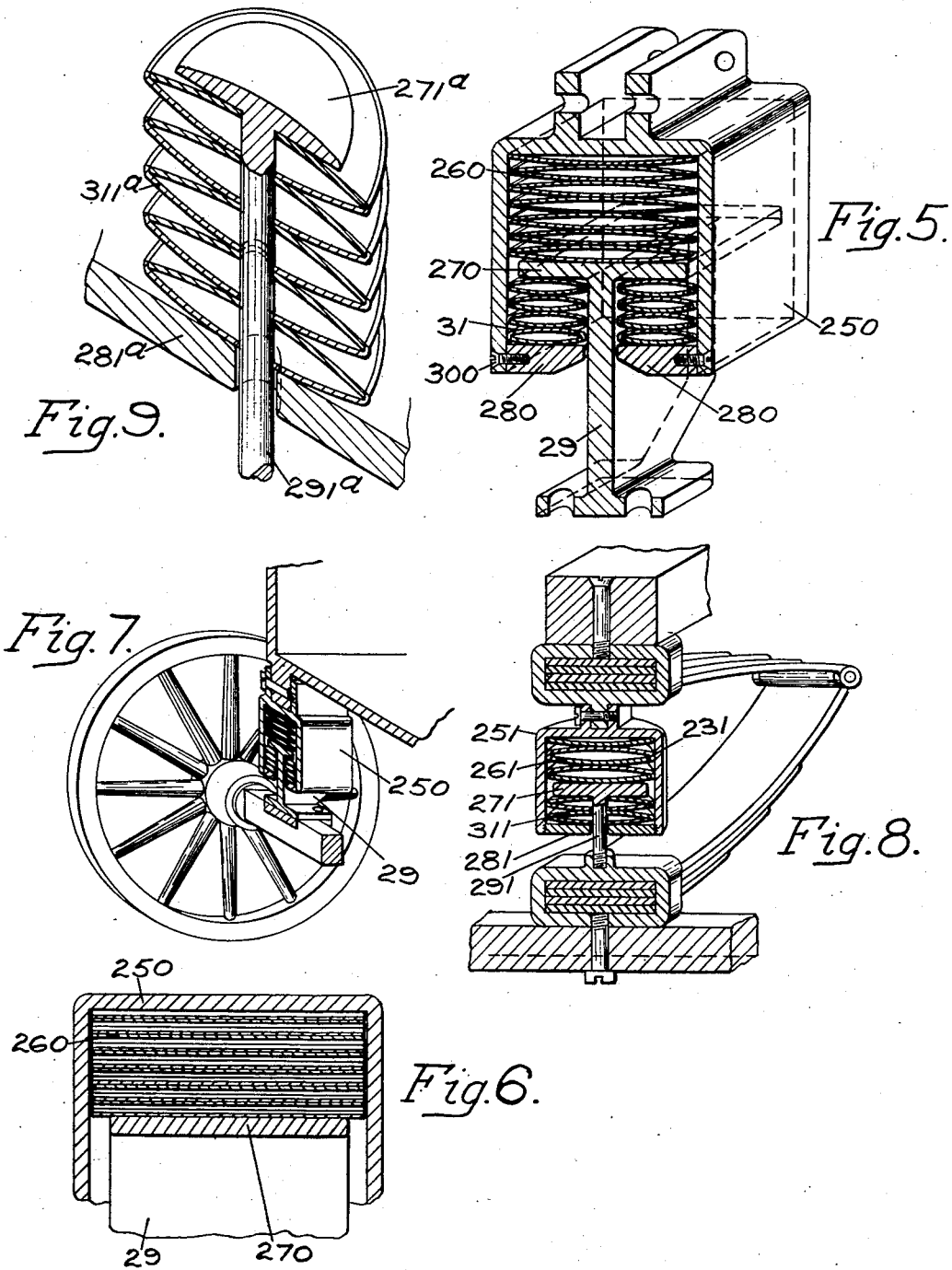

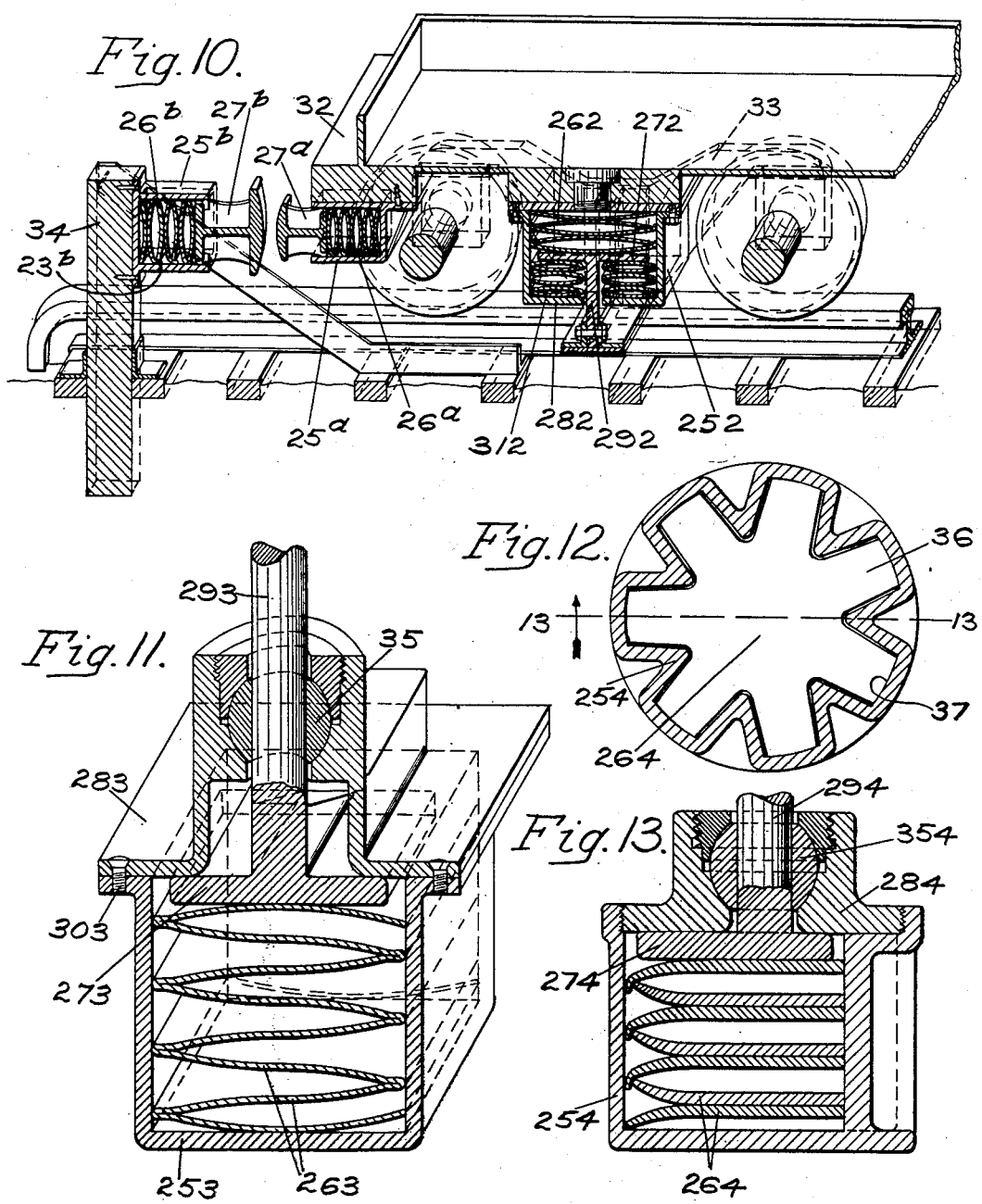

UNITED STATES PATENT OFFICE.

EDGAR J. HOUGH, OF WASHINGTON, DISTRICT OF COLUMBIA.

SHOCK-ABSORBER.

1,171,722.          Specification of Letters Patent.      Patented Feb. 15, 1916.

Application filed April 3, 1915. Serial No. 18,991.

*To all whom it may concern:*

Be it known that I, EDGAR J. HOUGH, a citizen of the United States, residing at Washington, in the District of Columbia, have invented or discovered certain new and useful Improvements in Shock-Absorbers, of which the following is a specification, reference being had therein to the accompanying drawings.

This invention has for its object to provide a shock absorbing or cushioning device of simple construction adapted to utilize in an efficient manner the combined retarding, cushioning or shock resisting effects of two or more properties of matter, such as friction, the elasticity of gases, the resilience of metals and other solids, and the inertia of fluids.

The foregoing and other more particular objects of the invention, together with means whereby the same may be carried into effect in a number of useful ways, will best be understood from the following description of certain forms or embodiments thereof illustrated in the accompanying drawings. It will be understood, however, that the particular constructions, arrangements and adaptations described and shown have been chosen for illustrative purposes merely, and that the invention, as defined by the claims hereunto appended, may be otherwise practised without departing from the spirit and scope thereof.

In said drawings: Figure 1 is a sectional perspective view, and Fig. 2 a section at right angles to Fig. 1 of a simple embodiment of the invention. Fig. 3 is a sectional perspective view of a modified construction. Fig. 4 is a similar view of a shock absorber for vehicles embodying another form of the invention. Fig. 5 is a similar view showing another form of shock absorber for vehicles. Fig. 6 is a detail section taken at right angles to Fig. 5. Fig. 7 is a sectional perspective view illustrating the device shown in Fig. 5 in use. Fig. 8 is a similar view showing another modification, the shock absorber being used in connection with the usual elliptical spring of the vehicle. Fig. 9 is an enlarged view of a cushioning device similar to that shown in the lower part of Fig. 8. Fig. 10 is a sectional perspective view of a portion of a railway car employing a shock absorber of the character shown in Fig. 5, and also showing a pair of coöperating bumpers embodying the invention. Fig. 11 is a sectional perspective view of a further modification. Fig. 12 is a transverse section and Fig. 13 is a longitudinal section of a still further modification. Fig. 14 is a longitudinal section of still another form of shock absorber. Figs. 15 and 16 are detail plan views of the cushioning plates employed in the device shown in Fig. 14. Fig. 17 is a longitudinal section of the device shown in Fig. 4.

A simple form of the invention is shown in Figs. 1 and 2, wherein 25 denotes a suitable container comprising, as shown, a rectangular box-like structure having a closed inner end and sides and an open top. The container 25 incloses a plurality of curved plates 26 composed of any suitable resilient material, such as spring steel. In this form of the invention the plates 26 partake of the form of cylindrical surfaces, being longitudinally straight and laterally curved, the several plates of the set being alternately curved in opposite directions forming a plurality of pairs. The edges of the adjacent plates of each pair engage one another loosely, said plates being also loosely disposed within the container 25. In this form of the invention each plate 26 is secured at a point intermediate its edges to the contiguous plate of the next adjacent pair as by means of a rivet 24. Also in this form of the invention the lateral edges of one of the plates of each pair are turned to form ribs or flanges 23 which are engaged by the unturned edges of the other plate of the pair and which engage the sides of the container when the plates are partly flattened, as hereinafter explained.

27 denotes a plunger of any suitable form loosely fitting the upper open end of the container 25 and adapted to transmit exterior shocks to the plates 26.

28 denotes strips secured to the upper edges of the container 25, as by means of bolts 30, and retaining the plunger 27 in place. If desired the strips 28 may be so positioned as to hold the plates 26 under an initial tension sufficient to enable said plates to support a predetermined initial load without yielding.

Separate portions of the air or other fluid imprisoned within the container 25 are between the plates 26 and the sides of the container and between adjacent plates. Any exterior force or shock applied to the plunger 27 tending to force the same downwardly into the container 25 tends also to force downwardly the plates 26 and to compress and flatten the same. Flattening of the plates 26 causes their horizontal area to be increased, thereby bringing the edges of said plates (or the flanges 23 thereon when such are employed) into engagement with the sides of the container, and also tends to compress the fluid between the plates and the walls of the container and between adjacent plates, and to force said fluid between the loosely engaged edges of adjacent plates and between the side and end edges of said plates and the walls of the container. Said force or shock, and the resultant movement, are therefore opposed by four cushioning or retarding influences or forces; first, the resilience of the plates 26; second, the elasticity of the imprisoned air or other cushioning fluid as it is compressed by the flattening of the plates; third, the retardation of the flow of the fluid through the restricted passages provided between the interengaging edges of the plates and between the side and end edges of said plates and the walls of the container; and fourth, by the frictional engagement of the side edges of the plates with the walls of said container.

As shown in Fig. 2 the end walls of the container 25 are slightly inclined so as to converge toward the inner end thereof. By this arrangement, as the plates are compressed, the spaces between the ends of the plates and the walls of the container are gradually reduced in size, so that the flow of the cushioning fluid therethrough is increasingly retarded and the resistance correspondingly increased with the force to be resisted.

The spaces or interstices between the container 25 and the plates 26 may, if desired, be filled with oil or other liquid in place of air, as above explained, in cases where greater resistance is desired. Under such circumstances it will be seen that the above noted cushioning effect due to the elasticity of the air will not be utilized, but the resistance of the flow of the non-compressible liquid from the spaces between the plates and the walls of the container and between adjacent plates will serve effectively to resist sudden relative movement of the parts while permitting a more gradual one.

The device shown in Fig. 3 is similar in general organization and in principle of operation to that shown in Figs. 1 and 2. This device comprises a container 255, a set of cushioning plates 265, and a plunger 275 operating in the container 255 and coöperating with the plates 265, said plunger being retained against complete withdrawal from the container 255 by means of pins 285 projecting through the wall of the container and engaging the outer face of the plunger. In this construction, however, the container 255 is cylindrical in form and the plates 265 are circular in plan, being so curved as to partake of the form of spherical or spheroidal surfaces and being in engagement with one another throughout their peripheries. Also in this construction the edges of the plates 265 are unturned, the lateral faces of said plates engaging one another adjacent said peripheries.

The shock absorber shown in Figs. 5, 6 and 7 comprises a container 250, a plunger 270, and a set of resilient plates 260 interposed between said plunger and the closed inner end of the container 250, the plates 260 being substantially similar in form, arrangement, and operation to the plates 26 shown in Figs. 1 and 2. In this form of the invention, however, the plunger 270 is provided with a web 29, and the outer end of the container 250 is provided with a pair of inwardly extending flange members 280 between the inner edges of which the web 29 projects, said flange members being secured to said container in any suitable manner, as by screws 300. Interposed between the plunger 270 and each of the flange members 280 is a set of cushioning plates 31 substantially similar in form, arrangement and operation to the cushioning plates 260, although of less width in order to permit two sets of said plates to be employed, one at either side of the web. The function of the plates 31 is to resist or cushion outward movement of the plunger 270, the plates 260 and 31 coöperating to cushion shocks upon the device in either direction. When used in connection with a shock absorber for vehicles the plates 260 will of course operate to cushion the device against inward shocks, while the plates 31 will operate to cushion the same against rebound. In this construction (see Fig. 6) the end walls of the container are parallel instead of convergent, the spaces between said walls and the ends of the plates 260 being sufficiently restricted to produce the desired retarding effect.

The device shown in Fig. 8 is similar in function and general arrangement to that shown in Fig. 5 and comprises a container 251 provided at its open end with a flange member 281, a plunger 271 in said container and provided with a stem 291 passing through an opening in the flange member 281, and inner and outer cushioning plates 261 and 311 respectively. In this form of the invention, however, the container 251 is of cylindrical form, the flange member 281 comprises a disk in threaded engagement with the outer end of said container, while the cushioning plates 261 and 311 are circular in plan, being so curved as to partake of the form of spherical or spheroidal surfaces, said container and plates corresponding substantially to the container 255 and plates 265 shown in Fig. 3, except that the edges of the alternate plates are turned to form flanges 231 similar to the flanges 23 shown in Fig. 1. Also in this construction only one set of plates 311 is employed at the outer side of the plunger, said plates being provided with central apertures through which the stem 291 extends.

A somewhat further developed form of the construction last referred to is shown in Fig. 9. In the last named figure the plunger 271$^a$ is provided with a stem 291$^a$ which passes through central openings in each of a series of oppositely curved spheroidal resilient plates 311$^a$, said plates being adapted to be compressed between the plunger 271$^a$ and the flange member 281$^a$.

In Fig. 10 is shown a car body 32 supported from trucks 33 by means of a shock absorbing or cushioning device substantially similar to that shown in Fig. 5. Said cushioning device comprises a container 252 having outer flange members 282, a plunger 272 provided with a web 292, and inner and outer cushioning plates 262 and 312 respectively. In Fig. 10 is also shown a pair of buffers or bumpers carried by the car 32 and by a track end stop 34 respectively. The buffer on the car 32 comprises a cushioning device substantially similar to that shown in Fig. 1 and including a container 25$^a$, a set of cushioning plates 26$^a$ and a plunger 27$^a$. The buffer on the end stop 34 comprises a substantially similar device including a container 25$^b$, plates 26$^b$, and a plunger 27$^b$. In this construction however each of the plates 26$^b$ is formed with one edge flange 23$^b$, the flanges on alternate plates being on opposite edges and being oppositely turned.

The device shown in Fig. 11 comprises a container 253 provided with a cover 283 secured to said container, as by screws or bolts 303, said cover being connected by means of a telescopic ball and socket joint 35 with the stem 293 of a plunger 273. In this form of the invention the set of cushioning plates 263 is formed from a single strip of resilient material repeatedly and reversely bent upon itself and suitably curved intermediate the reverse bends.

The construction shown in Figs. 12 and 13 comprises a substantially cylindrical container 254 provided with a cap or cover 284 in threaded engagement therewith, said cap or cover being connected by means of a telescopic ball and socket joint 354 with the stem 294 of a plunger 274. The cushioning plates 264 in this construction are curved into a general spherical or spheroidal form, but are substantially star shaped in plan, being formed with a series of radiating arms or fingers 36 which are received and guided in longitudinal channels 37 formed on the side walls of the container 254. The form and operation of each of the fingers 36 are somewhat similar to those of the singly curved or cylindrical plates 26 shown in Fig. 1, although the plates 264 considered as a whole are spherical or spheroidal in form as in the construction shown in Fig. 3. Preferably, and as shown, the fingers 36 are of decreasing thickness toward their ends or edges to provide for greater resilience.

The device shown in Figs. 14 to 16 comprises a cylindrical container 256, a plunger 276 and cushioning plates 266 and 266$^a$ alternately arranged and curved in opposite directions. The plates 266 are substantially similar to the plates 265 shown in Fig. 3, although provided with edge flanges 236, while the plates 266$^a$ are substantially similar to the plates 264 shown in Figs. 12 and 13 although of a constant thickness throughout.

The shock absorbing device shown in Figs. 4 and 17 is similar in general organization to that shown in Figs. 5 to 7 and comprises a container 257 provided with flange members 287, a plunger 277 having a web 297, and inner and outer cushioning plates 267 and 317. Unlike the container 250 shown in Fig. 6 the end walls of the container 257, as shown in Fig. 17, are inwardly converging at their inner ends, being similar to the end walls of the container 25 as shown in Fig. 2. The cushioning plates 317 are substantially similar to the cushioning plates 31 shown in Fig. 5. The plates 267 are longitudinally straight and laterally curved and are arranged in a plurality of series. The plates 267 of the entire set are all curved in the same direction and the plates of each series are offset with respect to the plates of the next adjacent series, so that the plates in successive series are in staggered relationship with one another. Each plate loosely engages at its edges the edges of adjacent plates of the same series and intermediate portions of contiguous plates in the next adjacent series. In order that each series of plates may substantially completely fill the horizontal cross-sectional area of the container 257, and thereby coöperate as a series with the walls of said container in accordance with the general principle above explained, one or both of the end plates of each or certain of the series is preferably made of greater length than the others and is reversely curved at its end as indicated at 38. Although the arrangement of the endmost plates of each series in close proximity to the walls of the container is preferable in order to secure their co-action, it will be seen that the cushioning effect of the plates themselves and of the fluid loosely imprisoned between adjacent plates may be utilized independently of such arrangement.

Having thus described my invention, I claim:

1. A shock absorbing device comprising a container and a curved plate of resilient material within said container, said plate being constructed and arranged to imprison a cushioning fluid between itself and the walls of said container.

2. A shock absorbing device comprising a container and a plurality of curved plates of resilient material within said container, said plates being constructed and arranged to imprison a cushioning fluid between themselves and the walls of said container and between each other.

3. A shock absorbing device comprising a container and a plurality of curved plates of resilient material within said container, said plates being constructed and arranged to loosely imprison a cushioning material between each other.

4. A shock absorbing device comprising a container and a curved plate of resilient material within said container and in loose engagement with the walls thereof, said plate being constructed and arranged to imprison a cushioning fluid between itself and said walls.

5. A shock absorbing device comprising a container and a plurality of curved plates of resilient material within said container, said plates being in loose engagement at their edges and being constructed and arranged to imprison a cushioning fluid between each other.

6. A shock absorbing device comprising a container, one or more curved plates of resilient material within said container and constructed and arranged to imprison a cushioning fluid, and a plunger for transmitting exterior forces to said plate or plates.

7. A shock absorbing device comprising a container, a plunger operating within said container, and cushioning devices within said container, on opposite sides of said plunger, each of said cushioning devices comprising one or more curved plates of resilient material constructed and arranged to imprison a cushioning fluid.

8. A shock absorbing device comprising a container having a closed inner end, a pair of flange members at the outer end of said container, a plunger operating within said container and having a web operating between said flange members, a cushioning device between said plunger and the closed inner end of said container, and cushioning devices between said plunger and said flange members on opposite sides of said web, each of said cushioning devices comprising one or more plates of resilient material constructed and arranged to imprison a cushioning fluid.

9. A shock absorbing device comprising a container and a curved plate of resilient material within said container, said plate being longitudinally straight and laterally curved and being constructed and arranged to imprison a cushioning fluid between itself and the walls of said container.

10. A shock absorbing device comprising a container and a plurality of interengaging longitudinally straight and laterally curved plates within said container, said plates being composed of resilient material and being constructed and arranged to imprison a cushioning fluid between themselves and the walls of said container and between each other.

11. A shock absorbing device comprising a container and a plurality of interengaging resilient plates within said container, said plates being all curved in the same direction and being constructed and arranged to imprison a cushioning fluid between each other.

12. A shock absorbing device comprising a container and a plurality of series of plates within said container, the plates of one or more of said series being curved and being composed of resilient material, said plates being constructed and arranged to imprison a cushioning fluid between themselves and the walls of said container.

13. A shock absorbing device comprising a container and a plurality of series of interengaging curved plates of resilient material within said container, the plates of the several series being constructed and arranged to imprison a cushioning fluid between each other.

14. A shock absorbing device comprising a container and a plurality of curved plates of resilient material within said container and longitudinally movable therein, said plates being constructed and arranged to imprison a cushioning fluid between themselves and the walls of said container and between each other, and being of a form and size, when partly flattened, to engage the wall of said container, whereby relative longitudinal movement of said plates and container is frictionally resisted.

15. A shock absorbing device comprising a container having inwardly converging walls and a curved plate of resilient material within said container, said plate being constructed and arranged to loosely imprison a cushioning fluid between itself and the walls of said container.

16. A shock absorbing device comprising a container having inwardly converging end walls, and a curved plate of resilient material within said container, said plate being longitudinally straight and laterally curved and being constructed and arranged to imprison a cushioning fluid between itself and the walls of said container.

In testimony whereof I affix my signature, in presence of two witnesses.

EDGAR J. HOUGH.

Witnesses:
CHAS. S. HYER,
ARTHUR W. CALVER.